US012478885B2

(12) United States Patent
Hou

(10) Patent No.: US 12,478,885 B2
(45) Date of Patent: Nov. 25, 2025

(54) METHOD FOR PROCESSING GAME INFORMATION, ELECTRONIC DEVICE, AND NON-TRANSITORY COMPUTER-READABLE STORAGE MEDIUM

(71) Applicant: NETEASE (HANGZHOU) NETWORK CO., LTD., Zhejiang (CN)

(72) Inventor: Yuanyuan Hou, Zhejiang (CN)

(73) Assignee: NETEASE (HANGZHOU) NETWORK CO., LTD., Zhejiang (CN)

( * ) Notice: Subject to any disclaimer, the term of this patent is extended or adjusted under 35 U.S.C. 154(b) by 45 days.

(21) Appl. No.: 18/252,539

(22) PCT Filed: Sep. 7, 2021

(86) PCT No.: PCT/CN2021/116998

§ 371 (c)(1),
(2) Date: May 11, 2023

(87) PCT Pub. No.: WO2023/272938

PCT Pub. Date: Jan. 5, 2023

(65) Prior Publication Data

US 2024/0115960 A1 Apr. 11, 2024

(30) Foreign Application Priority Data

Jun. 30, 2021 (CN) ......................... 202110739040.8

(51) Int. Cl.
*A63F 13/822* (2014.01)
*A63F 13/533* (2014.01)

(52) U.S. Cl.
CPC .......... *A63F 13/822* (2014.09); *A63F 13/533* (2014.09)

(58) Field of Classification Search
CPC ....... A63F 13/822; A63F 13/825; A63F 13/53
See application file for complete search history.

(56) References Cited

U.S. PATENT DOCUMENTS 7,570,261 B1 * 8/2009 Edecker .................. G06T 17/05 705/40
10,282,786 B1 * 5/2019 Osborne ................. A63F 13/80
(Continued)

FOREIGN PATENT DOCUMENTS

CN 105446593 A 3/2016
CN 109806596 A 5/2019
(Continued)

OTHER PUBLICATIONS

International Search Report dated Mar. 30, 2022 of International Application No. PCT/CN2021/116998.
1st Office Action dated Mar. 8, 2023 of Chinese Application No. 202110739040.8.
Waterwood Board Games—Ajay hoho,"[Ajay board game] Plague Crisis Basic edition teaching", Mar. 15, 2020 https://www.bilibili.com/video/BV1CE41137tb/?spm-id- from=333.788.recommend-more-video.-1&vd-source=fc0168139073eb2c2757c1c0340924c5.
(Continued)

*Primary Examiner* — Steve Rowland
(74) *Attorney, Agent, or Firm* — Qinghong Xu

(57) ABSTRACT

A method for processing game information, including: obtaining a target disease in a game of a virtual city, where the target disease comprises at least one disease in a disease database; determining a current transmission target disease in the virtual city according to a trigger probability and a trigger interval of the target disease, where the current transmission target disease is set to transmit in the virtual city at a preset rate; displaying a crisis early warning task corresponding to the current transmission target disease on the graphical user interface, where the crisis early warning task includes a disease name of the current transmission target disease and corresponding task information; and reducing, in response to completing the task information, the preset rate of transmission of the current transmission target disease in the virtual city.

19 Claims, 5 Drawing Sheets

(56) References Cited

U.S. PATENT DOCUMENTS

| | | | | |
|---|---|---|---|---|
| 2011/0062664 | A1* | 3/2011 | Royce | A63F 3/00088 273/254 |
| 2011/0143828 | A1* | 6/2011 | Bacos | A63F 13/69 463/43 |
| 2018/0310890 | A1* | 11/2018 | Li | A61B 5/4842 |
| 2019/0155993 | A1* | 5/2019 | Wilkerson | G06N 5/045 |
| 2021/0050116 | A1* | 2/2021 | Sabeti | G06N 7/01 |
| 2021/0387081 | A1* | 12/2021 | Islam | A63F 3/0478 |
| 2022/0139567 | A1* | 5/2022 | Jones | G16H 50/80 705/2 |
| 2023/0170098 | A1* | 6/2023 | Wang | G06F 30/15 703/11 |
| 2024/0115960 | A1* | 4/2024 | Hou | A63F 13/537 |

FOREIGN PATENT DOCUMENTS

| | | | |
|---|---|---|---|
| CN | 110215710 | A | 9/2019 |
| CN | 111729295 | A | 10/2020 |
| WO | 2007014358 | A2 | 2/2007 |
| WO | 2021016391 | A1 | 1/2021 |

OTHER PUBLICATIONS

Shou Tanji, "Plague Inc has updated the cure mode, under the highest difficulty, patients will injectthemselves with disinfectant", Nov. 13, 2020.

* cited by examiner

METHOD FOR PROCESSING GAME INFORMATION, ELECTRONIC DEVICE, AND NON-TRANSITORY COMPUTER-READABLE STORAGE MEDIUM

CROSS REFERENCE TO RELATED APPLICATIONS

The present disclosure is a National Stage Application of International Application No. PCT/CN2021/116998 filed on Sep. 7, 2021, which is based upon and claims the priority to Chinese Patent Application No. 202110739040.8, entitled "Method for Processing Game Information, Apparatus, Electronic Device, and Storage Medium" filed on 30 Jun. 2021, the entire content of both of which are incorporated by reference in the present disclosure for all purposes.

TECHNICAL FIELD

The present disclosure relates to the technical field of games, and in particular, to a method for processing game information and an apparatus, an electronic device, and a storage medium.

BACKGROUND

As one type of video games, simulation business games are popular among many players. In a simulation business game, a player usually plays a role of a manager and is responsible for operating and managing a virtual real world in a game, where the virtual real world may be a group such as a city, a country, a world, a company, etc.

In most of the simulation business games, the playing modes related to the medical treatment are pure hanging playing modes, a player only needs to input corresponding content when starting a game, and the game can automatically run through a series of operation rules according to user input and obtain a game result.

SUMMARY

According to a first aspect of the present disclosure, a method for processing game information is provided. The method includes: obtaining, by a terminal device with a graphical user interface, a target disease in a game of a virtual city, where the graphical user interface displays at least part of the virtual city in the game, and the target disease comprises at least one disease in a disease database; determining, by the terminal device, a current transmission target disease in the virtual city according to a trigger probability and a trigger interval of the target disease, where the current transmission target disease is configured to transmit in the virtual city at a preset rate; displaying a crisis early warning task corresponding to the current transmission target disease on the graphical user interface, where the crisis early warning task includes a disease name of the current transmission target disease and corresponding task information; and reducing, in response to completing the task information, the preset rate of transmission of the current transmission target disease in the virtual city.

According to a second aspect of the present disclosure, an electronic device is provided; the electronic device includes a processor, a storage medium and a bus; the storage medium stores with a machine-readable instruction executable by the processor; when the electronic device is running, the processor communicates with the storage medium through the bus, and the processor executes the machine-readable instruction to execute steps of the method according to any one of the above embodiments.

According to a third aspect of the present disclosure, a non-transitory computer-readable storage medium is provided, where a computer program is stored on the storage medium, and when the computer program is run by a processor, steps of the method according to any one of the above embodiments are executed.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure. The accompanying drawings in the following description are merely some embodiments of the present disclosure, and for a person of ordinary skill in the art, other drawings may be obtained according to these drawings without involving any inventive effort. In the drawings.

In the drawings, the same or corresponding reference numerals denote the same or corresponding parts.

DETAILED DESCRIPTION

Figure 1:
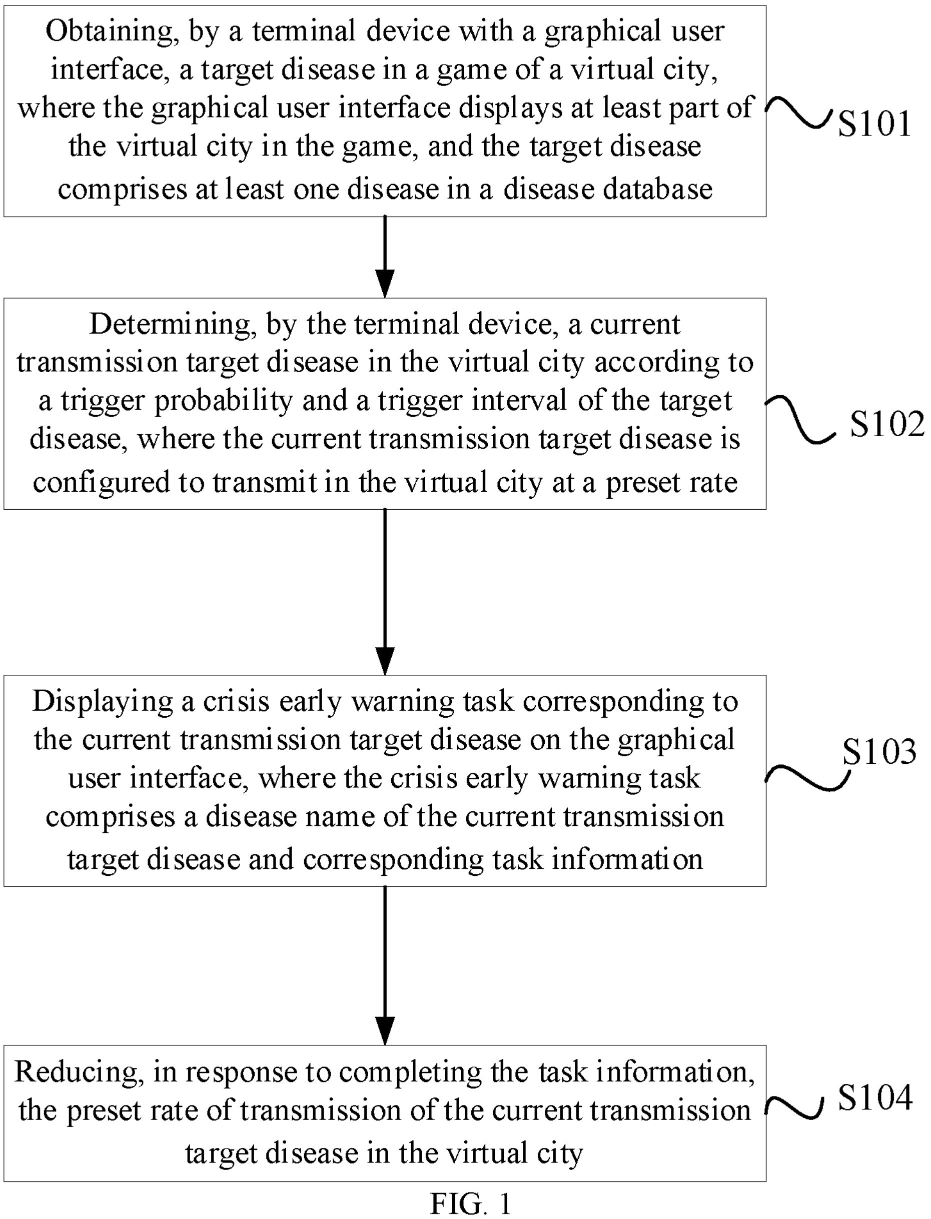
FIG. 1 is a schematic flowchart of a method for processing game information according to an embodiment of the present disclosure.

Reference will now be described in detail to examples, which are illustrated in the accompanying drawings. The following description refers to the accompanying drawings in which the same numbers in different drawings represent the same or similar elements unless otherwise represented. The examples described following do not represent all examples consistent with the present disclosure. Instead, they are merely examples of devices and methods consistent with aspects of the disclosure as detailed in the appended claims. Terms used in the present disclosure are merely for describing specific examples and are not intended to limit the present disclosure. The singular forms "one", "the", and "this" used in the present disclosure and the appended claims are also intended to include a multiple form, unless other meanings are clearly represented in the context. It should also be understood that the term "and/or" used in the present disclosure refers to any or all of possible combinations including one or more associated listed items.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

It should be understood that although terms "first", "second", "third", and the like are used in the present disclosure to describe various information, the information is not limited to the terms. These terms are merely used to differentiate information of a same type. For example, without departing from the scope of the present disclosure, first information is also referred to as second information, and similarly the second information is also referred to as the first information. Depending on the context, for example, the term "if" used herein may be explained as "when" or "while", or "in response to . . . , it is determined that".

In addition, the described embodiments are merely some embodiments of the present disclosure, rather than all of the embodiments. The components of embodiments of the present disclosure, which are generally described and illustrated here, may be arranged and designed in a variety of different configurations. Thus, the following detailed description of embodiments of the disclosure provided in the accompanying drawings is not intended to limit the scope of the present disclosure that is claimed, but merely represents selected embodiments of the present disclosure. All other embodiments obtained by those skilled in the art based on the embodiments of the present disclosure without creative efforts shall fall within the protection scope of the present disclosure.

It should be noted that, in the embodiments of the present disclosure, the term "including" is used to indicate the presence of the features declared after the term, but does not exclude adding other features.

Before the present disclosure is explained in detail, the application scenario of the present disclosure is described first.

A game for simulating business is a type of game very popular among players. In a simulation business game, a player usually plays a role of a manager and is responsible for operating and managing a virtual real world in a game, where the virtual real world may be a group such as a city, a country, a world, a company, etc. At present, in most of the simulation business games, the playing modes related to the medical treatment are pure hanging playing modes. In a pure hanging playing mode, a player only needs to input corresponding content when starting a game, and the game can automatically run through a series of operation rules according to user input and obtain a game result, without any subsequent operation from the player. Thus, the medical process in the existing simulation operation game is relatively simple, the medical process in the real world cannot be simulated and restored in the virtual city displayed on the graphical user interface provided by the terminal, it is split with the whole game, there is less content that the user can interact with, and the participation degree of the user is lower.

The present disclosure provides a method for processing game information, an apparatus, an electronic device, and a storage medium. The method includes: obtaining a target disease, the target disease being at least one disease in a pre-established disease database; determining a current transmission target disease in the virtual city according to a trigger probability and a trigger interval of the target disease, the current transmission target disease being set to transmit in the virtual city at a preset rate; displaying a crisis early warning task corresponding to the current transmission target disease on the graphical user interface, the crisis early warning task including a disease name of the current transmission target disease and corresponding task information; and in response to a completion event for the task information, reducing the preset rate of transmission of the current transmission target disease in the virtual city. According to the method for processing game information provided by the present disclosure, the medical process in the real world is simulated and restored in the virtual city displayed on the graphical user interface provided by the terminal, so that the content that the player can interact with in the medical process of the game is increased, the compactness with the whole game can be improved, and the participation degree of the player can be improved.

The method for processing game information in an embodiment of the present disclosure may be performed on a terminal device or a server. The terminal device may be a local terminal device. When the method for processing game information runs on a server, the method may be implemented and executed based on a cloud interaction system, where the cloud interaction system includes a server and a client device.

In some embodiments, various cloud applications may be run in the cloud interaction system, for example, a cloud game. Taking a cloud game as an example, a cloud game refers to a game mode based on cloud computing. In the running mode of the cloud game, the running body of the game program and the game screen presentation body are separated, the storage and operation of the method for processing game information are completed on the cloud game server, and the function of the client device is to receive and send data as well as presentation of game screen. For example, the client device may be a display device having a data transmission function close to the user side, such as a mobile terminal, a television, a computer, a palm computer, etc. However, the terminal device performing information processing is a cloud game server of the cloud. When a game is performed, the user operates the client device to send an operation instruction to the cloud game server, the cloud game server runs the game according to the operation instruction, encodes and compresses the data such as the game screen, returns it to the client device through the network, and finally decodes and outputs the game screen through the client device.

In some embodiments, the terminal device may be a local terminal device. Taking a game as an example, a local terminal device stores with a game program and is used for presenting a game screen. The local terminal device is used to interact with the user through the graphical user interface, that is, to download and install the game program and run it through the electronic device conventionally. It may include several manners for the local terminal device to provide the graphical user interface to the user may, for example, rendering and displaying it on a display screen of the terminal, or providing it to the user by means of holographic projection. For example, the local terminal device may include a display screen and a processor, the display screen is used to present a graphical user interface, the graphical user interface includes a game screen, and the processor is used to run the game, generate the graphical user interface, and control the display of the graphical user interface on the display screen.

According to some embodiments of the present disclosure, there is provided a method for processing game information. A graphical user interface is provided by a first terminal device, where the first terminal device may be the above-mentioned local terminal device, or may be a client device in the above-mentioned cloud interaction system.

Referring to FIG. 1, FIG. 1 is a schematic flowchart of a method for processing game information according to an embodiment of the present disclosure. It should be noted that the method for processing game information provided by the present disclosure is not limited in FIG. 1 and the following specific order, and it should be understood that in other embodiments, the sequence of some of the steps may be exchanged with each other according to actual needs, or some of the steps there may be omitted or deleted.

It should be noted that the execution body of the present method may be a first terminal device running with a target game, a graphical user interface is provided by the first terminal device, the graphical user interface at least displays part or entire all of the virtual city in the game, and the graphical user interface refers to a computer operation user interface displayed in a graphical manner, which allows the user to manipulate icons or menu controls on the screen by using a input device. Among them, the input device can be a mouse, for example, a touch screen, etc., which is not limited in the embodiments. The user can interact with the client or server through the graphical user interface during the game.

The process shown in FIG. 1 is described in detail below.

In S101, a target disease is obtained, where the target disease is at least one disease in a pre-established disease database.

In some embodiments, the disease in the disease database may correspond to a disease in the real world, for example, it may include pulmonary tuberculosis, influenza, etc. Or, it may be a disease set according to needs, which is not limited in the present disclosure.

Figure 2:
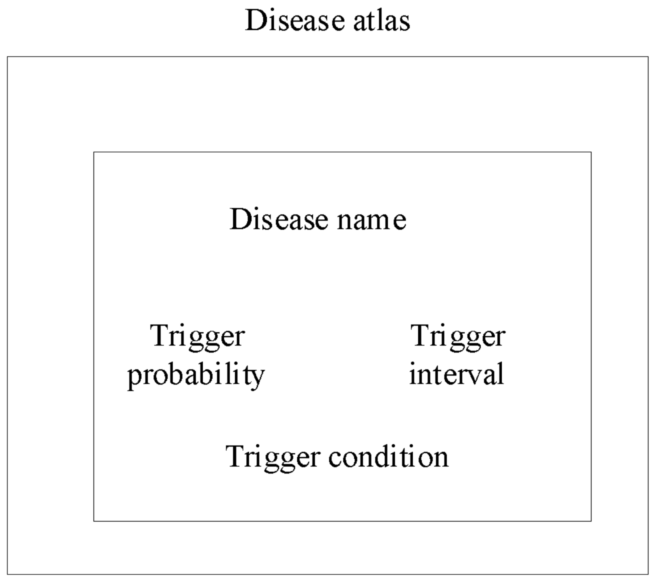
FIG. 2 is a schematic diagram of a disease atlas according to an embodiment of the present disclosure.

Referring to FIG. 2, In some embodiments, the disease database may be stored in the form of a disease atlas, and the user may view the disease in the disease database by viewing the disease atlas. For example, in response to a selection operation in the disease atlas, corresponding disease information is displayed. The disease information may include a disease name, a trigger condition, a trigger probability, and a trigger interval.

In S102, a current transmission target disease in the virtual city is determined according to the trigger probability and the trigger interval of the target disease, and the current transmission target disease is set to transmit in the virtual city at a preset rate.

In some embodiments, the probability of the target disease being determined as the current transmission target disease in the virtual city is positively correlated with the trigger probability of the target disease. When the target disease is within a period of the trigger interval, the trigger probability of the target disease is set to be zero. That is, when the trigger interval of the target disease is the same, the greater the trigger probability, the greater the probability that the corresponding target disease is determined as the current transmission target disease in the virtual city; the smaller the trigger probability, and the smaller the probability that the corresponding target disease is determined as the current transmission target disease in the virtual city. Timing is started when the target disease is determined as the current transmission target disease. During the period of the trigger interval of the target disease, the trigger probability of the target disease is set to be zero. That is, during the period of the trigger interval of the target disease, the target disease will not be determined as the current transmission target disease in the virtual city. In some embodiments, after the period of the trigger interval of the target disease, the trigger probability of the target disease is restored, that is, the trigger probability of the target disease is restored to a value before the trigger probability of the target disease is set to be zero.

In some embodiments, a functional relationship between the probability that the target disease is determined as the current transmission target disease in the virtual city and the trigger probability of the target disease can be constructed to realize that the probability that the target disease is determined as the current transmission target disease in the virtual city is positively correlated to the trigger probability of the target disease. For example, a function relationship may be constructed: $x=m\times p$, where the probability that the target disease is determined as the current transmission target disease in the virtual city is x, the trigger probability of the target disease is p, and the first preset parameter is m. The first preset parameter here is a positive number, and its specific value is not limited in the present disclosure. It is only one example here and does not mean that the present disclosure is limited to this.

In addition, the current transmission target disease is set to transmit in the virtual city at a preset rate, where the preset rate may be a value set according to needs, which is not specifically limited in the present disclosure.

In the embodiments of the present disclosure, the virtual city includes a plurality of virtual objects, the virtual objects may be virtual characters in the game, such as farmers, workers, soldiers and the like in the game, the preset rate refers to transmitting a first preset number of virtual objects per unit time, and the current transmission target disease being transmitted in the virtual city at a preset rate refers to that: in the virtual city, there will be a first preset number of virtual objects infection the current transmission target disease per unit time. The unit time and the first preset number may be set according to needs, and the specific values of them are not limited in the present disclosure.

In S103, a crisis early warning task corresponding to the current transmission target disease is displayed on the graphical user interface, where the crisis early warning task includes a disease name of the current transmission target disease and corresponding task information.

Figure 3:
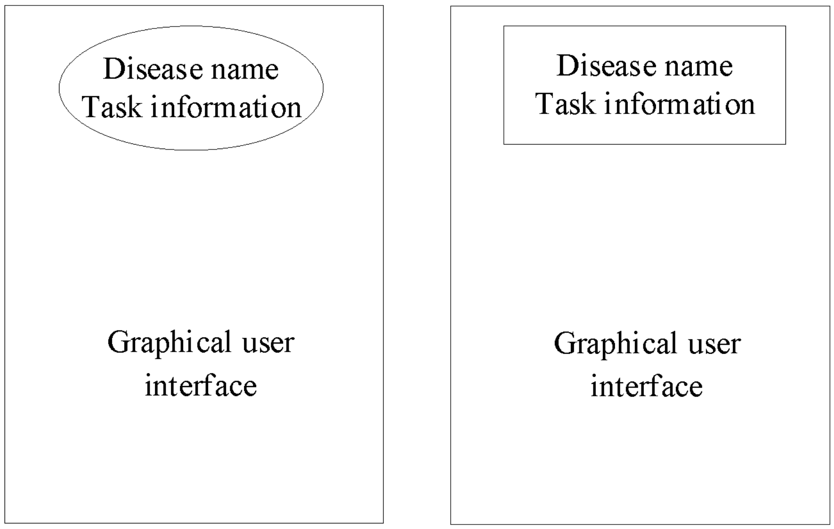
FIG. 3 is a schematic diagram of display of a crisis early warning task according to an embodiment of the present disclosure.

Referring to FIG. 3, In some embodiments, the crisis early warning task corresponding to the current transmission target disease can be displayed in the form of a bubble on the graphical user interface. The crisis early warning task corresponding to the current transmission target disease can also be displayed in the form of a prompt box. Or, the crisis early warning task corresponding to the current transmission target disease can be displayed in the form of combination of prompt tone and animation, so that the interestingness of the game is improved, and the game participation degree of the user is improved.

A prompt of successful treatment may also be displayed in other forms, which is merely illustrative, and is not intended to be limited to this in the present disclosure.

In some embodiments, the task information includes at least one of constructing a virtual building, issuing a law, providing food, or improving a grade of the virtual city. Constructing the virtual building may include constructing a virtual hospital, constructing a virtual medical station, constructing a virtual rescue, constructing a factory, constructing a house, etc. Issuing a law may include issuing a law on garbage centralized management, issuing a law street cleaning, issuing a law on street cleaning, issuing a law on epidemic prevention and publicity, etc. Providing food may include providing vegetarian food, providing meat food, etc. The present disclosure is merely illustrative and is not intended to be limited to this in the present disclosure.

In addition, there may be a corresponding relationship between the disease name of the current transmission target disease and the task information. For example, when the current transmission target disease is influenza, the corresponding task information may be to improve the grade of the virtual city to 15 and provide meat food. The present disclosure is merely illustrative and is not intended to be limited to this in the present disclosure.

In S104, in response to a completion event for the task information, a preset rate of current transmission of the target disease in the virtual city is reduced.

If the user completes the task information, that is, it represents that the transmission rate of the current transmission target disease forms a certain degree of suppression, the preset rate of transmission of the current transmission target disease in the virtual city can be reduced, so that the simulation and reduction degree of the game on the medical process in the real world is higher, the compactness of the medical process with the whole game in the game can be improved, and the participation degree of the player can be improved.

Figure 4:
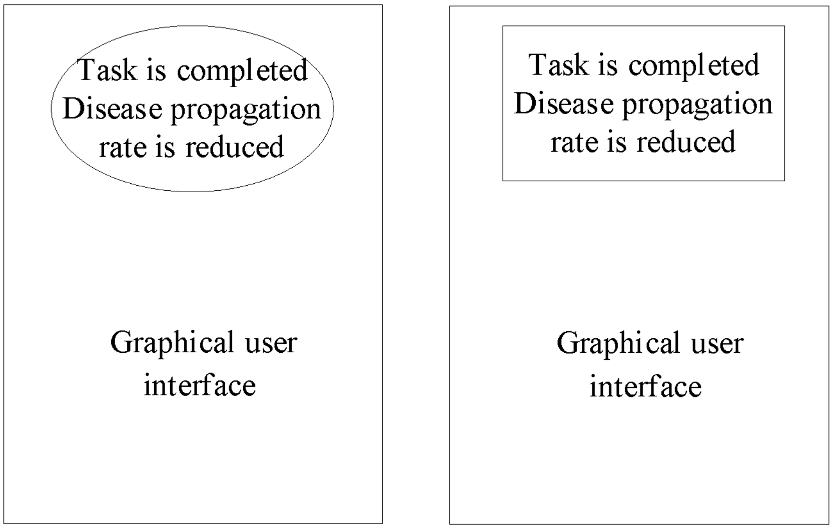
FIG. 4 is a schematic diagram of display of task completion according to an embodiment of the present disclosure.

Referring to FIG. 4, In some embodiments, a prompt on the completion event of the task information and reduction of the preset rate of transmission of the current transmission target disease in the virtual city may be performed on the graphical user interface. The prompt may be in the form of a bubble, or may be in the form of a prompt box, and may also be in a form of combination of prompt tone and animation, thus facilitating improving the interestingness of the game and improving the game participation degree of the user.

In addition, the value specifically reduced by the preset rate may correspond to the task information. For example, the current transmission target disease is influenza, and the task information includes improving the grade of the virtual city to 15, providing meat food and issuing a law on garbage centralized management. If the user completes improving the grade of the virtual city to 15 and providing meat food, the preset rate of transmission of the current transmission target disease in the virtual city is reduced by a first preset value. If the user completes issuing a law on garbage centralized management, the preset rate of transmission of the current transmission target disease in the virtual city is reduced by a second preset value. If the user both completes improving the grade of the virtual city to 15 and providing meat food, and completes issuing a law on garbage centralized management, the preset rate of transmission of the current transmission target disease in the virtual city is reduced by a third preset value. Among them, the first preset value and the second preset value may be equal or unequal, and the third preset value may be the sum of the first preset value and the second preset value. The present disclosure is merely illustrative and is not intended to be limited to this in the present disclosure.

In some embodiments, the method further includes: adjusting the trigger probability and the trigger interval of the target disease through at least one of the following information: the distribution information of the virtual buildings constructed in the virtual city; the law information issued by the virtual city; the food information provided by the virtual city; or the grade information of the virtual city.

In some embodiments, the trigger probability and the trigger interval of different target diseases are adjusted by different information. For example, the distribution of the virtual factory and the virtual house in the virtual city influences the trigger probability and the trigger interval of the pulmonary tuberculosis. For example, the more the virtual house affected by the virtual factory, the higher the trigger probability of the pulmonary tuberculosis, and the lower the trigger interval. The food information provided by the virtual city and the grade information of the virtual city influence the trigger probability and the trigger interval of the influenza. For example, if the food provided by the virtual city is vegetarian, the lower the grade of the virtual city is, the larger the trigger probability of the influenza is, and the smaller the trigger interval is. The present disclosure is merely illustrative and is not intended to be limited to this in the present disclosure.

In some embodiments, the method further includes: in response to an end event of the current transmission target disease, re-determining the target disease after a preset time interval, and determining the trigger probability and the trigger interval of the adjusted target disease; and re-determining the current transmission target disease in the virtual city according to the trigger probability and the trigger interval of the adjusted target disease.

In the embodiments of the present disclosure, the process of determining the current transmission target disease in the virtual city according to the trigger probability and the trigger interval of the target disease can be continuously circulated in the game playing process of the user. That is, after the current transmission target disease is finished, and after a preset time interval, a new current transmission target disease in the virtual city is determined again according to the trigger probability and the trigger interval of the adjusted target disease. The new current transmission target disease is set to transmit in the virtual city at a new preset rate. The specific value of the preset time interval is not limited in the present disclosure. It should be noted that the process of the end event of completing the current transmission target disease by the user may affect and adjust the trigger probability and the trigger interval of the target disease, and the end event of the current transmission target disease may be, for example, the user completing the preset number of task information, which is not limited in the present disclosure.

In some embodiments, the target disease includes pulmonary tuberculosis, and the method further includes: when the distribution information of the virtual buildings constructed in the virtual city satisfies the first preset condition, increasing the trigger probability of the pulmonary tuberculosis, and reducing the trigger interval of the pulmonary tuberculosis.

The first preset condition may be that the number of virtual houses affected by the virtual factory reaches a second preset number. That is, when the number of virtual houses affected by the virtual factory reaches a second preset number, the trigger probability of the pulmonary tuberculosis is increased, and the trigger interval of the pulmonary tuberculosis is reduced. The first preset condition may also be that the number of virtual houses within a preset distance of the virtual factory reaches a third preset number. That is, when the number of virtual houses within the preset distance of the virtual factory reaches a third preset number, the trigger probability of the pulmonary tuberculosis is increased, and the trigger interval of the pulmonary tuberculosis is reduced. The present disclosure is merely illustrative and is not intended to be limited to this in the present disclosure.

In some embodiments, the increase value of the trigger probability and the decrease value of the trigger interval of the pulmonary tuberculosis can be determined by a pre-established function relationship or mapping table between the trigger probability and the trigger interval of the pulmonary tuberculosis and the number of virtual houses affected by the virtual factory. For example, the number of virtual houses affected by the virtual factory is reduced by every 10, the trigger probability of the pulmonary tuberculosis is reduced by 1%, and the trigger interval of the pulmonary tuberculosis is increased by 1 per unit time. The function relationship or mapping table between the trigger probability and the trigger interval of pulmonary tuberculosis and the number of virtual houses affected by the virtual factory may be set according to needs, which is not limited in the present disclosure.

In some embodiments, the method further includes: when the law information issued by the virtual city satisfies a second preset condition, increasing the trigger probability of all the target diseases, and reducing the trigger interval of all the target diseases.

The second preset condition may be that a law on garbage centralized management is not issued. That is, when the law on garbage centralized management is not issued, the trigger probability of all target diseases is increased, and the trigger interval of all target diseases is reduced. The second preset condition may also be that a law on street cleaning is not issued. That is, when the law on street cleaning is not issued, the trigger probability of all the target diseases is increased, and the trigger interval of all the target diseases is reduced. The second preset condition may also be that a law on epidemic prevention and publicity, that is, when the law on epidemic prevention and publicity is not issued, the trigger probability of all the target diseases is increased, and the trigger interval of all the target diseases is reduced. The present disclosure is merely illustrative and is not intended to be limited to this in the present disclosure.

In some embodiments, the increase value of the trigger probability and the decrease value of the trigger interval can be determined by a pre-established function relationship or mapping table between the increase value of the trigger probability and the decrease value of the trigger interval and the law information issued by the virtual city. For example, the virtual city issues a law on garbage centralized management, the trigger probability of all the target diseases is reduced by 1%, and the trigger interval of all the target diseases is increased by 1 per unit time. The function relationship between the increase value of the trigger probability and the decrease value of the trigger interval and the law information issued by the virtual city may be set according to needs, which is not limited in the present disclosure.

In some embodiments, the target disease includes influenza, and the method further includes: when the food information provided by the virtual city and the grade information of the virtual city satisfy a third preset condition, increasing the trigger probability of the influenza and reducing the trigger interval of the influenza.

The third preset condition may be that the grade of the virtual city reaches a preset grade, and the virtual city does not provide meat food. That is, when the grade of the virtual city reaches a preset grade, and the virtual city does not provide meat food, the trigger probability of influenza is increased, and the trigger interval of influenza is reduced. The third preset condition may also be that the grade of the virtual city reaches a preset grade, and the proportion of the meat food provided by the virtual city is less than a fourth preset value. That is, when the grade of the virtual city reaches the preset grade, and the proportion of the meat food provided by the virtual city is less than the fourth preset value, the trigger probability of the influenza is increased, and the trigger interval of the influenza is reduced. The present disclosure is merely illustrative and is not intended to be limited to this in the present disclosure.

In some embodiments, the increase value of the trigger probability and the decrease value of the trigger interval of the influenza can be determined by a pre-established function relationship or mapping table between the trigger probability and the trigger interval of the influenza and the proportion of the meat food provided by the virtual city. For example, the proportion of the meat food provided by the virtual city is reduced by every 5%, the trigger probability of the influenza is increased by 1%, and the trigger interval of the influenza is reduced by 1 per unit time. The functional relationship between the trigger probability and the trigger interval of the influenza and the proportion of the meat food provided by the virtual city may be set according to needs, which is not limited in the present disclosure.

In some embodiments, before obtaining the target disease, the method further includes: establishing a disease database, where the disease database includes various disease information, and each disease information includes a disease name, a trigger condition, a trigger probability, and a trigger interval.

In some embodiments, the disease name in the disease database may correspond to the disease name in the real world. For example, the disease name may be pulmonary tuberculosis, influenza, etc. Or it may be a disease name set according to needs, which is not limited in the present disclosure.

In some embodiments, obtaining a target disease includes: determining at least one target disease satisfying a target trigger condition from the pre-established disease database based on attribute information of the virtual city, where the attribute information includes city scale information, sanitary diet information, and environmental information.

In some embodiments, the city scale information is used to indicate the city scale of the virtual city, the sanitary diet information is used to indicate the sanitary diet condition of the virtual city, and the environment information is used to indicate the environmental condition of the virtual city. In some embodiments, each piece of information may correspond to a plurality of indicators. For example, the city scale information corresponds to a large scale, medium scale and small scale. The sanitary diet information corresponds to be excellent, good, general, and poor. Environmental information corresponds to be good, general, poor, etc. The present disclosure is merely illustrative and is not intended to be limited to this in the present disclosure.

In some embodiments, the trigger condition of the disease information is used for indicating the request of the corresponding disease on the attribute information of the virtual city, and the target trigger condition corresponds to the attribute information of the virtual city. The determining at least one target disease satisfying the target trigger condition from the pre-established disease database based on the attribute information of the virtual city, includes: determining at least one disease information that the trigger condition matches with the attribute information of the virtual city from the pre-established disease database as a target disease.

In the embodiments of the present disclosure, the specific steps of obtaining the target disease satisfying the target trigger condition may be: screening out disease information that the trigger condition in the disease database matches with the target trigger condition. A fourth preset number of disease information is randomly determined from the disease information that the trigger condition matches with the target trigger condition as a target disease. The present disclosure does not limit the specific value of the fourth preset number.

For example, the city scale information of the virtual city is large scale, the health diet information is general, the environment information is good. The target trigger condition corresponds to the attribute information of the virtual city, that is, the target trigger condition is that the city scale information is large scale, the health diet information is general, and the environment information is good. The trigger condition of the disease information in the disease database is used to indicate request of corresponding disease information on the attribute information of the virtual city. Assuming that the disease information database includes the fifth preset number of diseases, the trigger conditions in the corresponding disease information are all that the city scale information is large scale, the health diet information is general, and the environment information is good. At least one disease information can be randomly determined from the fifth preset number of diseases as the target disease.

Figure 5:
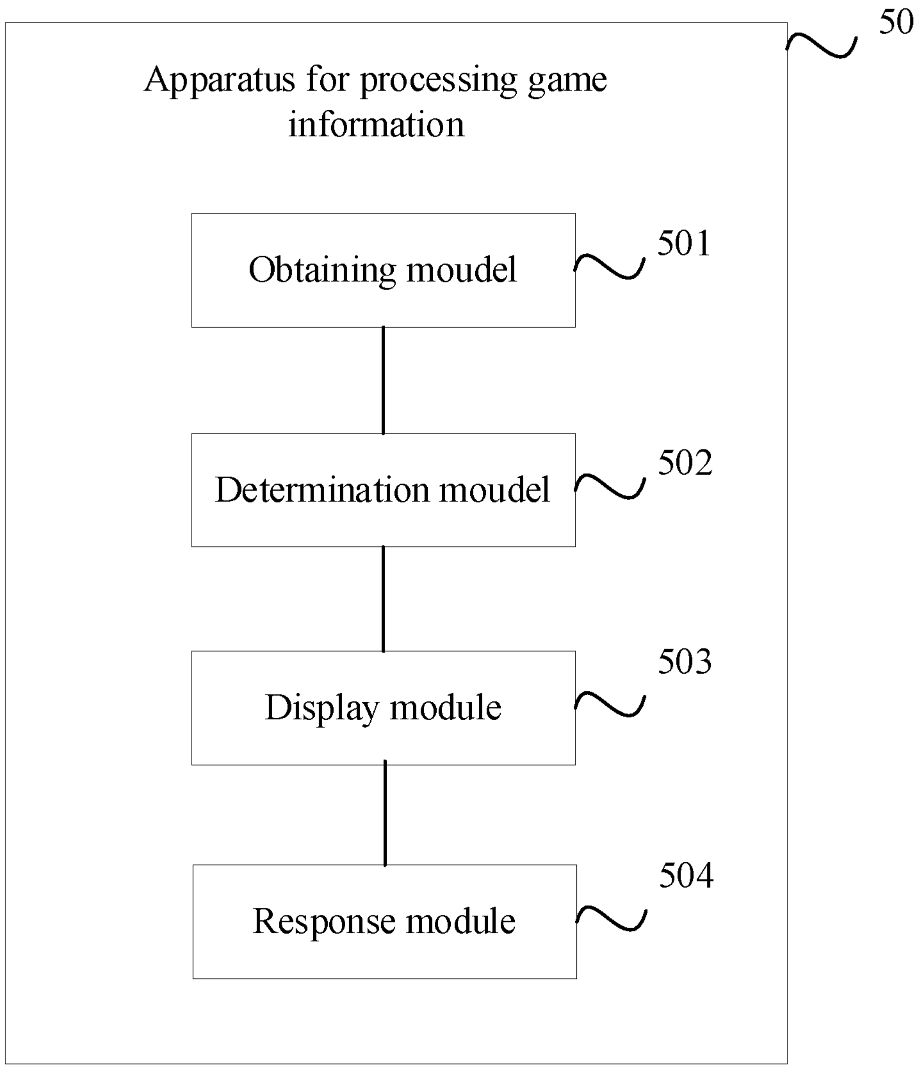
FIG. 5 is a schematic diagram of an apparatus for processing game information according to an embodiment of the present disclosure.

Referring to FIG. 5, according to embodiments of the present disclosure, there is provided an apparatus for processing game information 50. A graphical user interface is provided through a first terminal device, where the graphical user interface displays at least part or entire of the virtual city in the game, and the apparatus includes:

an obtaining module 501, configured to obtain a target disease, where the target disease is at least one disease in a pre-established disease database;

a determination module 502, configured to determine a current transmission target disease in the virtual city according to a trigger probability and a trigger interval of the target disease, where the current transmission target disease is set to transmit in the virtual city at a preset rate;

a display module 503, configured to display a crisis early warning task corresponding to the current transmission target disease on the graphical user interface, where the crisis early warning task includes a disease name of the current transmission target disease and corresponding task information;

a response module 504, configured to reduce, in response to a completion event for the task information, the preset rate of transmission of the current transmission target disease in the virtual city.

In some embodiments, the apparatus further includes an adjustment module configured to adjust the trigger probability and the trigger interval of the target disease through at least one of the following information: the distribution information of the virtual buildings constructed in the virtual city; the law information issued by the virtual city; the food information provided by the virtual city; or the grade information of the virtual city.

In some embodiments, the target disease includes pulmonary tuberculosis, and the adjustment module is further configured to increase the trigger probability of the pulmonary tuberculosis and reduce the trigger interval of the pulmonary tuberculosis when the distribution information of the virtual buildings constructed in the virtual city satisfies the first preset condition.

In some embodiments, the adjustment module is further configured to increase the trigger probability of all the target diseases and reduce the trigger interval of all the target diseases, when the law information issued by the virtual city satisfies the second preset condition.

In some embodiments, the target disease includes influenza, and the adjustment module is further configured to increase the trigger probability of the influenza and reduce the trigger interval of the influenza when the food information provided by the virtual city and the grade information of the virtual city satisfy the third preset condition.

In some embodiments, the apparatus further includes a database establishment module configured to establish a disease database, where the disease database includes various disease information, and each disease information includes a disease name, a trigger condition, a trigger probability, and a trigger interval.

In some embodiments, the obtaining module 501 is specifically configured to determine at least one target disease satisfying the target trigger condition from a pre-established disease database based on the attribute information of the virtual city, where the attribute information includes city scale information, sanitary diet information, and environmental information.

In some embodiments, the trigger condition of the disease information is used for indicating the request of the corresponding disease on the attribute information of the virtual city, the target trigger condition corresponds to the attribute information of the virtual city, and the obtaining module is specifically configured to determine at least one disease information that the trigger condition matches with the attribute information of the virtual city from the pre-established disease database as the target disease.

In some embodiments, the probability of the target diseases being determined as the current transmission target disease in the virtual city is positively correlated with the trigger probability of the target disease; and when the target disease is within a period of the trigger interval, the trigger probability of the target disease is set to be zero.

In some embodiments, the task information includes at least one of constructing a virtual building, issuing a law, providing food, or increasing a grade of the virtual city.

The above-mentioned apparatus is used for executing the method provided in the foregoing embodiment, and the embodiment principle and technical effect to them are similar, and details are not described here again.

The above modules may be one or more integrated circuits configured to implement the above method, for example, one or more application specific integrated circuits (ASIC), or one or more digital signal processors (referred to as DSP), or one or more field programmable gate arrays (FPGA), etc. For another example, when a certain module is implemented in the form of a processing element scheduling a program code, the processing element may be a general-purpose processor, for example, a central processing unit (referred to as CPU) or another processor that may invoke a program code. For another example, these modules may be integrated together and implemented in the form of a system-on-a-chip (referred to as SOC).

The modules described above may be connected or communicated to each other via a wired connection or a wireless connection. The wired connection may include a metal cable, an optical cable, a hybrid cable, or the like, or any combination of them. The wireless connection may include connections in the form of LAN, WAN, Bluetooth, ZigBee, or NFC, or any combination of them. Two or more modules may be combined into a single module, and any one of the modules may be divided into two or more cells. A person skilled in the art may clearly understand that, for convenience and brevity of description, the described system and apparatus specific working process may refer to the corresponding process in the method embodiment, and details are not described in the present disclosure.

It should be noted that the above modules may be one or more integrated circuits configured to implement the above method, for example, one or more application specific integrated circuits (ASIC), or one or more digital signal processors (referred to as DSP), or one or more field programmable gate arrays (FPGA), etc. For another example, when a certain module is implemented in the form of a processing element scheduling a program code, the processing element may be a general-purpose processor, for example, a central processing unit (CPU) or another processor that may invoke a program code. For another example, these modules may be integrated together and implemented in the form of a system-on-a-chip (referred to as SOC).

Figure 6:
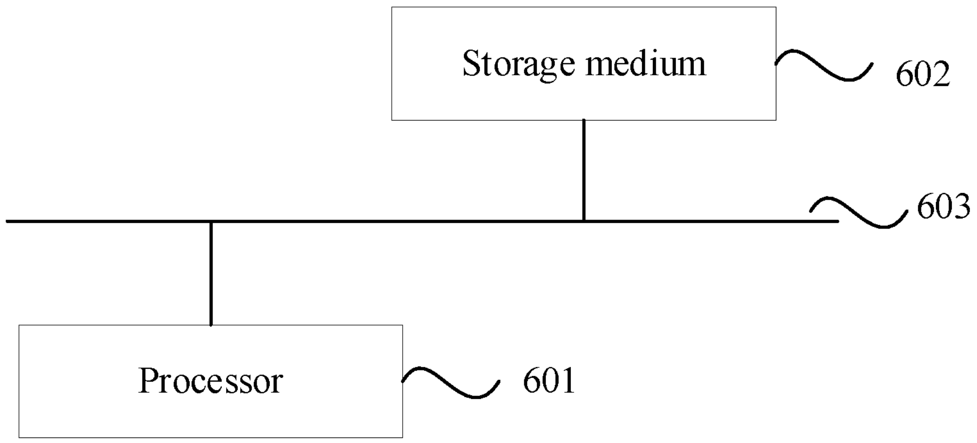
FIG. 6 is a schematic diagram of an electronic device according to an embodiment of the present disclosure.

Referring to FIG. 6, according to an embodiment of the present disclosure, there is provided an electronic device 60, including: a processor 601, a storage medium 602, and a bus 603, where the storage medium 602 stores with a machine-readable instruction executable by the processor 601, and when the electronic device 60 is running, the processor 601 communicates with the storage medium 602 through the bus 603, and the processor 601 executes the machine-readable instruction to execute the steps of any one of the foregoing embodiments.

According to an embodiment of the present disclosure, there is provided a computer readable storage medium. A computer program is stored on the computer readable storage medium, and when the computer program is run by a processor, the steps of any one of the foregoing embodiments are executed.

The present disclosure provides a method for processing game information, an apparatus, an electronic device, and a storage medium. The method includes: obtaining a target disease, the target disease being at least one disease in a pre-established disease database; determining a current transmission target disease in the virtual city according to a trigger probability and a trigger interval of the target disease, the current transmission target disease being set to transmit in the virtual city at a preset rate; displaying a crisis early warning task corresponding to the current transmission target disease on the graphical user interface, the crisis early warning task including a disease name of the current transmission target disease and corresponding task information; and in response to a completion event for the task information, reducing the preset rate of transmission of the current transmission target disease in the virtual city. According to the method for processing game information provided by the present disclosure, the medical process in the real world is simulated and restored in the virtual city displayed on the graphical user interface provided by the terminal, so that the content that the player can interact with in the medical process of the game is increased, the compactness with the whole game can be improved, and the participation degree of the player can be improved.

In the several embodiments provided in the present disclosure, it should be understood that the disclosed apparatus and method may be implemented in other manners. For example, the apparatus embodiments described above are merely illustrative, for example, the division of the units is merely a logical function division, and there may be another division manner during actual embodiment, for example, more than one unit or component may be combined or may be integrated into another system, or some features may be ignored or not performed. The mutual coupling or direct coupling or communication connection shown or discussed may be an indirect coupling or communication connection through some interfaces, devices, or units, and may be electrical, mechanical, or other forms.

The units described as separate components may or may not be physically separate, and components displayed as units may or may not be physical units, that is, may be located in one place, or may be distributed on more than one network unit. Some or all of the units may be selected according to actual needs to achieve the objectives of the solutions of the embodiments.

In addition, functional units in the embodiments of the present disclosure may be integrated into one processing unit, or each of the units may exist alone physically, or two or more units may be integrated into one unit. The integrated unit may be implemented in the form of hardware, or may be implemented in the form of a hardware plus software functional unit.

The integrated unit implemented in the form of a software functional unit may be stored in a computer-readable storage medium. The software functional unit is stored in a storage medium, and includes several instructions for enabling a computer device (which may be a personal computer, a server, or a network device, etc.) or a processor to perform some of the steps of the method according to various embodiments of the present disclosure. The foregoing storage medium includes various medium that can store program codes, such as a USB flash disk, a mobile hard disk, a read-only memory (referred to as ROM), a random-access memory (referred to as RAM), a magnetic disk, or an optical disc.

What is claimed is:

1. A method for processing game information, comprising:

obtaining, by a terminal device with a graphical user interface, a target disease in a game of a virtual city, wherein the graphical user interface displays at least part of the virtual city in the game, and the target disease comprises at least one disease in a disease database;

determining, by the terminal device, a current transmission target disease in the virtual city according to a trigger probability and a trigger interval of the target disease, wherein the current transmission target disease is configured to transmit in the virtual city at a preset rate;

displaying a crisis early warning task corresponding to the current transmission target disease on the graphical user interface, wherein the crisis early warning task comprises a disease name of the current transmission target disease and corresponding task information; and reducing, in response to completing the task information, the preset rate of transmission of the current transmission target disease in the virtual city;

wherein the task information comprises at least one of following tasks: constructing a virtual building, issuing a law, providing food, or increasing a grade of the virtual city.

2. The method according to claim 1, wherein the method further comprises:

adjusting the trigger probability and the trigger interval of the target disease according to at least one of following information:

distribution information of virtual buildings constructed in the virtual city;

law information issued by the virtual city;

food information provided by the virtual city; or grade information of the virtual city.

3. The method according to claim 2, wherein the method further comprises:

updating, in response to an end event of the current transmission target disease, the target disease after a preset time interval, and determining the trigger probability and the trigger interval of the target disease; and updating the current transmission target disease in the virtual city according to the trigger probability and the trigger interval of the target disease.

4. The method according to claim 2, wherein the target disease comprises pulmonary tuberculosis, and the method further comprises:

in response to determining that the distribution information of the virtual buildings constructed in the virtual city satisfies a first preset condition, increasing the trigger probability of the pulmonary tuberculosis and reducing the trigger interval of the pulmonary tuberculosis.

5. The method according to claim 2, wherein the method further comprises:

in response to determining that the law information issued by the virtual city satisfies a second preset condition, increasing the trigger probability of all target diseases and reducing the trigger interval of all target diseases.

6. The method according to claim 2, wherein the target disease comprises influenza, and the method further comprises:

in response to determining that the food information provided by the virtual city and the grade information of the virtual city satisfy a third preset condition, increasing the trigger probability of the influenza and reducing the trigger interval of the influenza.

7. The method according to claim 1, wherein the method further comprises:

establishing the disease database, wherein the disease database comprises disease information, and the disease information comprises a disease name, a trigger condition, the trigger probability, and the trigger interval.

8. The method according to claim 7, wherein obtaining the target disease comprises:

determining, based on attribute information of the virtual city, at least one target disease satisfying a target trigger condition from the disease database, wherein the attribute information comprises at least one of city scale information, sanitary diet information, or environmental information.

9. The method according to claim 8, wherein the trigger condition of the disease information is configured for indicating a request of a corresponding disease on the attribute information of the virtual city, the target trigger condition corresponds to the attribute information of the virtual city; and wherein determining the at least one target disease satisfying the target trigger condition from the disease database based on the attribute information of the virtual city comprises:

determining at least one disease information that the trigger condition matches with the attribute information of the virtual city from the disease database as the target disease.

10. The method according to claim 1, wherein a probability of the target diseases being determined as the current transmission target disease in the virtual city is positively correlated with the trigger probability of the target disease; and in response to determining that the target disease is within a period of the trigger interval, the trigger probability of the target disease is set to be zero.

11. An electronic device, wherein the electronic device comprises: a processor, a storage medium and a bus, the storage medium stores with a machine-readable instruction executable by the processor, and when the electronic device is running, the processor communicates with the storage medium through the bus, and the processor executes the machine-readable instruction to:

obtain a target disease in a game of a virtual city, wherein the electronic device comprises a graphical user interface, the graphical user interface displays at least part of the virtual city in the game, and the target disease comprises at least one disease in a disease database;

determine a current transmission target disease in the virtual city according to a trigger probability and a trigger interval of the target disease, wherein the current transmission target disease is configured to transmit in the virtual city at a preset rate;

display a crisis early warning task corresponding to the current transmission target disease on the graphical user interface, wherein the crisis early warning task comprises a disease name of the current transmission target disease and corresponding task information; and reduce, in response to completing the task information, the preset rate of transmission of the current transmission target disease in the virtual city;

wherein the task information comprises at least one of following tasks: constructing a virtual building, issuing a law, providing food, or increasing a grade of the virtual city.

12. A non-transitory computer-readable storage medium, wherein a computer program is stored on the storage medium, and when the computer program is run by a processor, a method for processing game information is executed, wherein the method comprises:

obtaining a target disease in a game of a virtual city, wherein a graphical user interface of a terminal device displays at least part of the virtual city in the game, and the target disease comprises at least one disease in a disease database;

determining a current transmission target disease in the virtual city according to a trigger probability and a trigger interval of the target disease, wherein the current transmission target disease is configured to transmit in the virtual city at a preset rate;

displaying a crisis early warning task corresponding to the current transmission target disease on the graphical user interface, wherein the crisis early warning task comprises a disease name of the current transmission target disease and corresponding task information; and reducing, in response to completing the task information, the preset rate of transmission of the current transmission target disease in the virtual city;

wherein the task information comprises at least one of following tasks: constructing a virtual building, issuing a law, providing food, or increasing a grade of the virtual city.

13. The method according to claim 1, wherein the method further comprises:

performing a prompt in response to completing the task information and reduction of the preset rate of transmission of the current transmission target disease in the virtual city on the graphical user interface.

14. The method according to claim 4, wherein the first preset condition comprises at least one of:

a number of virtual houses affected by a virtual factory reaching a second preset number; or a number of virtual houses within a preset distance of a virtual factory reaching a third preset number.

15. The method according to claim 14, wherein an increase value of the trigger probability and a decrease value of the trigger interval of the pulmonary tuberculosis is determined by a function relationship or mapping table between the trigger probability and the trigger interval of the pulmonary tuberculosis and the number of virtual houses affected by the virtual factory.

16. The method according to claim 5, wherein the second preset condition comprises at least one of:

a law on garbage centralized management being not issued;

a law on street cleaning being not issued; or law on epidemic prevention and publicity being not issued.

17. The method according to claim 16, wherein an increase value of the trigger probability and a decrease value of the trigger interval is determined by a function relationship or mapping table between the increase value of the trigger probability and the decrease value of the trigger interval and the law information issued by the virtual city.

18. The method according to claim 6, wherein the third preset condition comprises at least one of:

a grade of the virtual city reaching a preset grade and the virtual city not providing meat food; or a grade of the virtual city reaching a preset grade and proportion of meat food provided by the virtual city being less than a fourth preset value.

19. The method according to claim 18, wherein an increase value of the trigger probability and a decrease value of the trigger interval of the influenza is determined by a function relationship or mapping table between the trigger probability and the trigger interval of the influenza and the proportion of the meat food provided by the virtual city.

* * * * *